US011990325B2

(12) United States Patent
Covey et al.

(10) Patent No.: US 11,990,325 B2
(45) Date of Patent: May 21, 2024

(54) SYSTEM AND METHOD TO CONDUCT CORRELATED CHEMICAL MAPPING

(71) Applicant: DH Technologies Development Pte. Ltd.

(72) Inventors: Thomas R. Covey, Newmarket (CA); Chang Liu, Richmond Hill (CA); Gary J. Van Berkel, Oak Ridge, TN (US)

(73) Assignee: DH Technologies Development Pte. Ltd., Singapore (SG)

( * ) Notice: Subject to any disclaimer, the term of this patent is extended or adjusted under 35 U.S.C. 154(b) by 474 days.

(21) Appl. No.: 17/427,300

(22) PCT Filed: Feb. 3, 2020

(86) PCT No.: PCT/IB2020/050852
§ 371 (c)(1),
(2) Date: Jul. 30, 2021

(87) PCT Pub. No.: WO2020/157737
PCT Pub. Date: Aug. 6, 2020

(65) Prior Publication Data
US 2022/0148866 A1 May 12, 2022

Related U.S. Application Data

(60) Provisional application No. 62/800,233, filed on Feb. 1, 2019.

(51) Int. Cl.
*H01J 49/00* (2006.01)
*H01J 49/04* (2006.01)
*H01J 49/06* (2006.01)

(52) U.S. Cl.
CPC ...... *H01J 49/0004* (2013.01); *H01J 49/0418* (2013.01); *H01J 49/0431* (2013.01); *H01J 49/063* (2013.01)

(58) Field of Classification Search
CPC ............... H01J 49/0004; H01J 49/0418; H01J 49/0431; H01J 49/063; H01J 49/04
See application file for complete search history.

(56) References Cited

U.S. PATENT DOCUMENTS 5,377,003 A * 12/1994 Lewis .................. G01J 3/2823 356/318
RE36,529 E * 1/2000 Lewis .................. G01J 3/2823 250/339.02

(Continued)

OTHER PUBLICATIONS

International Search Report and Written Opinion for PCT/IB2020/050852 dated Apr. 21, 2020.

(Continued)

*Primary Examiner* — David A Vanore

(57) ABSTRACT

A method for the repeated analysis of a sample bearing location. The sample bearing location may include, for instance, a sampled point in a tissue slice that is spatially and temporally correlated to the original slice. The slice may be in whole, or in part, a complete item or a portion of a complete item such as, for example, a human organ. The method improves the analysis process, such as mass spectrometry analysis, by providing a much more complete characterization of the target. The method also allows for the splitting of the sample and chemical/physical alteration of the aliquots for enhanced chemical analysis.

20 Claims, 11 Drawing Sheets

(56) References Cited

U.S. PATENT DOCUMENTS

| | | | | |
|---|---|---|---|---|
| 9,285,443 | B2 * | 3/2016 | He | G01R 33/1284 |
| 9,554,738 | B1 * | 1/2017 | Gulati | A61B 5/0075 |
| 9,915,714 | B2 * | 3/2018 | He | G01R 33/34046 |
| 2006/0074835 | A1 * | 4/2006 | Maggioni | G06V 20/69<br>706/45 |
| 2007/0127022 | A1 * | 6/2007 | Cohen | G01N 21/65<br>356/326 |
| 2008/0034833 | A1 * | 2/2008 | Maier | G01J 3/44<br>73/1.01 |
| 2008/0144001 | A1 * | 6/2008 | Heeg | G01L 1/24<br>356/256 |
| 2016/0154077 | A1 * | 6/2016 | He | G01R 33/5607<br>324/309 |
| 2016/0305820 | A1 * | 10/2016 | Zollars | G01J 3/0216 |
| 2017/0010153 | A1 * | 1/2017 | Vezard | G01J 3/0291 |
| 2021/0096025 | A1 * | 4/2021 | Allen | G01J 3/2823 |
| 2022/0148866 | A1 * | 5/2022 | Covey | H01J 49/0418 |
| 2023/0400408 | A1 * | 12/2023 | Barrett | G01N 21/3563 |

OTHER PUBLICATIONS

Vilmos Kertesz et al: "Sampling reliability, spatial resolution, spatial precision, and extraction efficiency in droplet-based liquid microjunction surface sampling: Basics of LMJ/HPLC/MS/MS sampling", Rapid Communications in Mass Spectrometry, vol. 28, No. 13, Jul. 15, 2014, pp. 1553-1560, XP55684342.

* cited by examiner

SYSTEM AND METHOD TO CONDUCT CORRELATED CHEMICAL MAPPING

CROSS-REFERENCE TO RELATED APPLICATIONS

This application claims priority to and the benefit of U.S. Provisional Patent Application No. 62/800,233 filed Feb. 1, 2019, the entire content of which is incorporated by reference herein.

FIELD

This application relates to chemical mapping systems and methods.

BACKGROUND

Use of multimodal physical/chemical imaging or mapping platforms with mass spectrometry detection as one mode of the imaging is a rapidly accelerating application space in biological, material and other sciences and fields of inquiry (Porta Siegel T et al., (2018), Mol Imaging Biol, 20(6):888-901; and Sans M et al., (2017), Curr Opin Chem Biol, 42:138-46) and Eberlin L S et al., (2011), 1811(11): 946-60.

Mass spectrometry-based chemical imaging (MSI) is a technique used to visualize the spatial distribution of elements and molecules. Mass spectrometry-based chemical imaging currently involves spatially resolved sampling of a material location, i.e. liberating species into the gas phase, an intertwined or subsequent gas phase ionization process of molecular species liberated from the surface, and the mass analysis of these ionized species. Mass spectrometry imaging thus involves three main steps—sampling, ionization and mass analysis. The choice of approach used for each step determines the type and degree of chemical information obtained. Mass spectra from the material sampled from spatially-registered locations, i.e. pixel or voxel, are sequentially acquired until the desired portion of the material is scanned. The mass spectral data is used to map chemical distributions across the sample pixel (voxel) by pixel (voxel). Because of the destructive nature of the sampling process and the connected serial nature of the ionization and mass analysis, the chemical content of each spatial location, i.e., pixel (area location) or voxel (volume location), can only be examined once. Since the time for analysis of material from each location is extremely short with present approaches (<<1 s), the number of different mass spectral measurements that can be made, and therefore, the depth of chemical information that can be gleaned via mass spectrometry at each pixel, is extremely limited.

The field of mass spectrometry based chemical imaging is currently dominated by Secondary Ion Mass Spectrometry (SIMS), Matrix Assisted Laser Desorption ionization (MALDI), Laser Ablation Electrospray Ionization (LAESI) and Desorption Electrospray Ionization (DESI)-based (Porta Siegel T et al., (2018), Mol Imaging Biol, 20(6):888-901) surface sampling/ionization systems, See FIG. 1. There has also been a trend towards multimodal imaging. These systems aim to combine other chemical or physical images of the sample under investigation along with the mass spectral data of the same. There is also the understanding that mass spectrometry incorporating an ion mobility separation can be used to enhance mass spectral derived chemical information from complex samples. In addition, ambient ionization techniques for sampling/ionization are increasingly recognized as beneficial compared to vacuum based sampling/ionization, due to the ability to use these techniques on multiple mass spectrometry platforms, the ease of preparing samples as opposed to vacuum based techniques, and the option to use these techniques with other imaging methods. Operating at atmospheric pressure outside of the mass spectrometer vacuum chamber provides any conceived system with more flexibility in physical arrangement.

There are a number of limitations and desired needs for advancing these multimodal imaging systems that incorporate mass spectrometry. Some of the more important desired needs include, but are not limited to: image co-registration and the ability to carry out all imaging on one platform; absolute quantitation which currently is restricted by difficulties in preparation of "standards"; and, overcoming the short time, one time analysis of each pixel/voxel (typically <1 s) limits broad based analyte detection/identification/quantitation.

Current approaches to mass spectrometry-based multimodal chemical imaging, which aim to provide more extensive chemical information from samples, are problematic due to the destructive nature of the sample analyses and the limited time in which to perform mass spectrometry analysis. There is a need in the art for improving the sensitivity of mass spectrometry-based chemical imaging to detect low-abundance molecules, quantification, and molecular identification from mass spectra.

SUMMARY

In some embodiments, methods and systems are provided to overcome the "one-time" analysis limitation and re-interrogation. The various workflows provide unprecedented "deep dive" chemical analysis, including in a spatially-registered format, compared to current procedures. By designing an analysis process that uses extremely low sample volumes, more sample is available for further analysis and re-interrogation.

In some embodiments, a system and/or method is provided for the repeated analysis of a sample bearing location. The sample bearing location may include, for instance, a point in a tissue slice that is spatially and temporally correlated to the original slice. The slice may be in whole, or in part, a complete item or a portion of a complete item such as, for example, a human organ. In aspects, for instance, the organ may comprise skin from a patient and the slice may comprise a selected portion of the skin for analysis. The sample bearing location(s) may comprise, for instance, one or more sampling locations from the selected portion of skin. The spatially-registered coordinates being referenced back to the selected portion of skin to identify which portion of the skin locates the one or more sampling locations. Accordingly, analysis results may be co-registered to a physical location on the selected portion of skin.

In aspects, the system and/or method improves the analysis process, such as mass spectrometry analysis, by providing a more complete characterization of the target. In aspects, the system and/or method also allows for the splitting of each sample, for instance for multiple interrogations, and chemical/physical alteration of the aliquots, ie sample processing, for enhanced chemical analysis of the sample.

In some embodiments, systems and/or methods for chemical mapping are provided that may include: a spectroscopic imager to obtain one or more physical or chemical spatially-registered spectroscopic images of a material to be analyzed; a sampling system to obtain a spatially-registered sample from the material to be analyzed and to transfer said material to a corresponding receptacle; a sample transfer unit to introduce said spatially-registered sample, or a portion thereof, from the receptacle to a mass spectrometer for analysis to produce analytical mass spectral data; and a data analysis system to collect and store the one or more physical or chemical spectroscopic images and the analytical mass spectral data wherein said data analysis system further generates co-registered information regarding the spatially-correlated spectroscopic images and the analytical mass spectral chemical data.

In some aspects, a chemical mapping system may include a chemical processing unit to process the spatially-registered sample in the receptacle before transfer to the mass spectrometer.

In some aspects, the spectroscopic imager is selected from the group consisting of a charge coupled device camera, optical bright field microscope, a fluorescence microscope, an infrared spectrometer, a Raman spectrometer, a X-ray spectrometer, a profilometer, an optical imager, and combinations thereof.

In some aspects, the sampling system used to obtain a spatially-registered sample from the material to be analyzed and to transfer said material to a processing plate is selected from the group consisting of a laser microdissection instrument, a pin-based sampler, a liquid extraction-based sampler and combinations thereof.

In some aspects, the receptacle is a well of a microtiter plate that contains a plurality of wells. In some aspects, each well location on the microtiter plate may be assigned a corresponding spatial location on the material and each sample may be transferred to a well corresponding to its sampling location from the material. In some aspects, the receptacle is a vial, ampoule, or aliquot.

In some aspects, the chemical processing unit employed to process the spatially-registered sample in the receptacle is a magnetic bead mixer or a solid phase extraction well plate. In some aspects, the chemical processing unit may be an immunoassay or chemical assay preparation station.

In some aspects, the sample transfer unit is used to introduce the spatially-registered samples or portions thereof from the receptacle to a mass spectrometer for analysis as droplets using a droplet dispenser wherein said droplet dispenser is an acoustic droplet dispenser or a pneumatic droplet dispenser.

In some aspects, sample is transferred from the receptacle to the mass spectrometer by introduction into an open port interface (OPI). In some aspects, sample droplets from the droplet dispenser are transferred to an ionization source of the mass spectrometer using an open port interface (OPI).

In some aspects, the sample transfer unit that is used to submit a spatially-registered sample, or a portion thereof, from the receptacle to a mass spectrometer for analysis is an autosampler wherein a specific location on the receptacle from which the spatially-registered sample is taken from is recorded.

In some aspects, the ionization source of the mass spectrometer is selected from the group consisting of: electrospray ionization, atmospheric pressure chemical ionization, atmospheric pressure photoionization, corona discharge, bombardment, or inductively coupled plasma ionization, as known for ionizing sample for analysis by mass spectrometry.

In some aspects, the mass spectrometer subjects the spatially-registered sample to ambient or vacuum based ion mobility spectrometry prior to mass spectral analysis.

In some aspects, the mass spectrometer is selected from the group consisting of a quadrupole mass spectrometer, a multiquadrupole mass spectrometer, a time of flight system mass spectrometer, an ion trap variant mass spectrometer and a hybrid combination thereof.

In some embodiments, a method is provided to perform a correlated chemical mapping of a sample. The method may include: taking one or more spectroscopic physical or chemical images of a material to be analyzed by mass spectroscopy; extracting one or more spatially-registered samples from the material and transferring each of said extracted spatially-registered samples to a corresponding receptacle; transferring one or more spatially-registered samples from the corresponding receptacles to a mass spectrometer for analysis; analyzing said one or more spatially-registered samples using mass spectrometry; generating analytical mass spectral data for each of the spatially-registered samples; and processing the one or more spectroscopic physical or chemical images and the mass spectral data to produce co-registered spatially correlated spectroscopic data and analytical mass spectral data for each of the spatially-registered samples.

In some aspects, the generating analytical mass spectral data may be performed a plurality of times on sample material from at least one of the receptacles to generate a plurality of analytical mass spectral data items for that sample material.

The method may include processing the extracted spatially-registered one or more samples in the receptacles before transfer to the mass spectrometer. The processing of the samples in the receptacles may be performed by mixing the sample with magnetic beads using a magnetic bead mixer or extracting a solid phase from the sample using a solid phase extraction well plate. The processing of the samples in the receptacles may be performed by adding one or more reagents, mixing the sample in the presence of the reagents, and isolating one or more analytes from the mixture for transfer to the mass spectrometer for analysis.

The method may include the one or more spectroscopic physical or chemical images being taken using a spectroscopic imager selected from the group consisting of a charge coupled device camera, optical bright field microscope, a fluorescence microscope, an infrared spectrometer, a Raman spectrometer, a X-ray spectrometer, a profilometer, an optical imager, and combinations thereof.

The method may include the step of extracting one or more spatially-registered sample from the material and transferring said extracted spatially-registered sample to a receptacle by using a laser microdissection instrument, a pin-based sampler, a liquid extraction-based sampler and combinations thereof.

The method may include the step of submitting one or more spatially-registered samples to a mass spectrometer for analysis by transferring the one or more spatially-registered samples, or portions thereof, as droplets using a droplet dispenser wherein said droplet dispenser is an acoustic droplet dispenser or a pneumatic droplet dispenser.

The method may include the spatially-registered sample droplets from the droplet dispenser transferred to the ionization source of a mass spectrometer using an open port interface.

The method may include said receptacles comprising wells of a microtiter plate, and wherein the step of transferring the one or more spatially-registered samples to a mass spectrometer for analysis is achieved using an autosampler based on a specific location of each well on the microtiter plate.

The method may include the mass spectrometer further comprising an ionization source selected from the group consisting of electrospray ionization, atmospheric pressure chemical ionization, atmospheric pressure photoionization, corona discharge needle, bombardment, or inductively coupled plasma ionization.

The method may include subjecting the processed spatially-registered samples to ambient or vacuum-based ion mobility spectrometry prior to analyzing said samples using mass spectrometry.

In some embodiments, the system and/or method may include transferring one or more spatially-registered samples form the corresponding receptacles for secondary analysis. In some aspects, the secondary analysis may include: chromatography, chemical, optical, capillary electrophoresis, or other non-mass spectrometry analysis method. Secondary analysis results produced by the secondary analysis may be co-registered as spatially correlated secondary analysis results for that sample.

Accordingly, sample material in a receptacle may be interrogated one or more times by one or more analysis methods, and results generate from each analysis for a sample may be co-registered to create a set of spatially-registered results for that sample.

DETAILED DESCRIPTION

Figure 1:
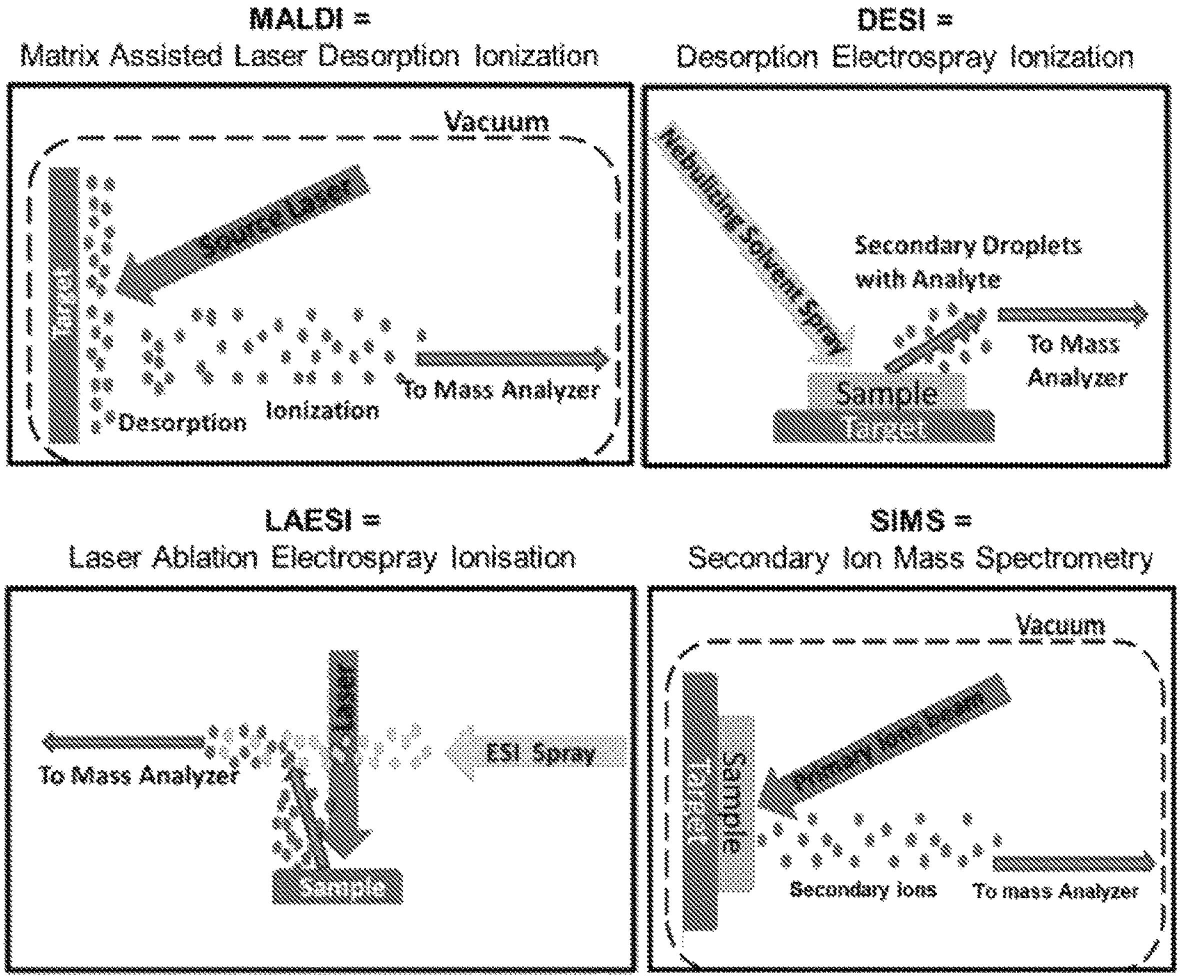
FIG. 1 is a graphic comparison of the main ionization techniques employed by mass spectrometry-based chemical imaging (MSI)
Figure 2:
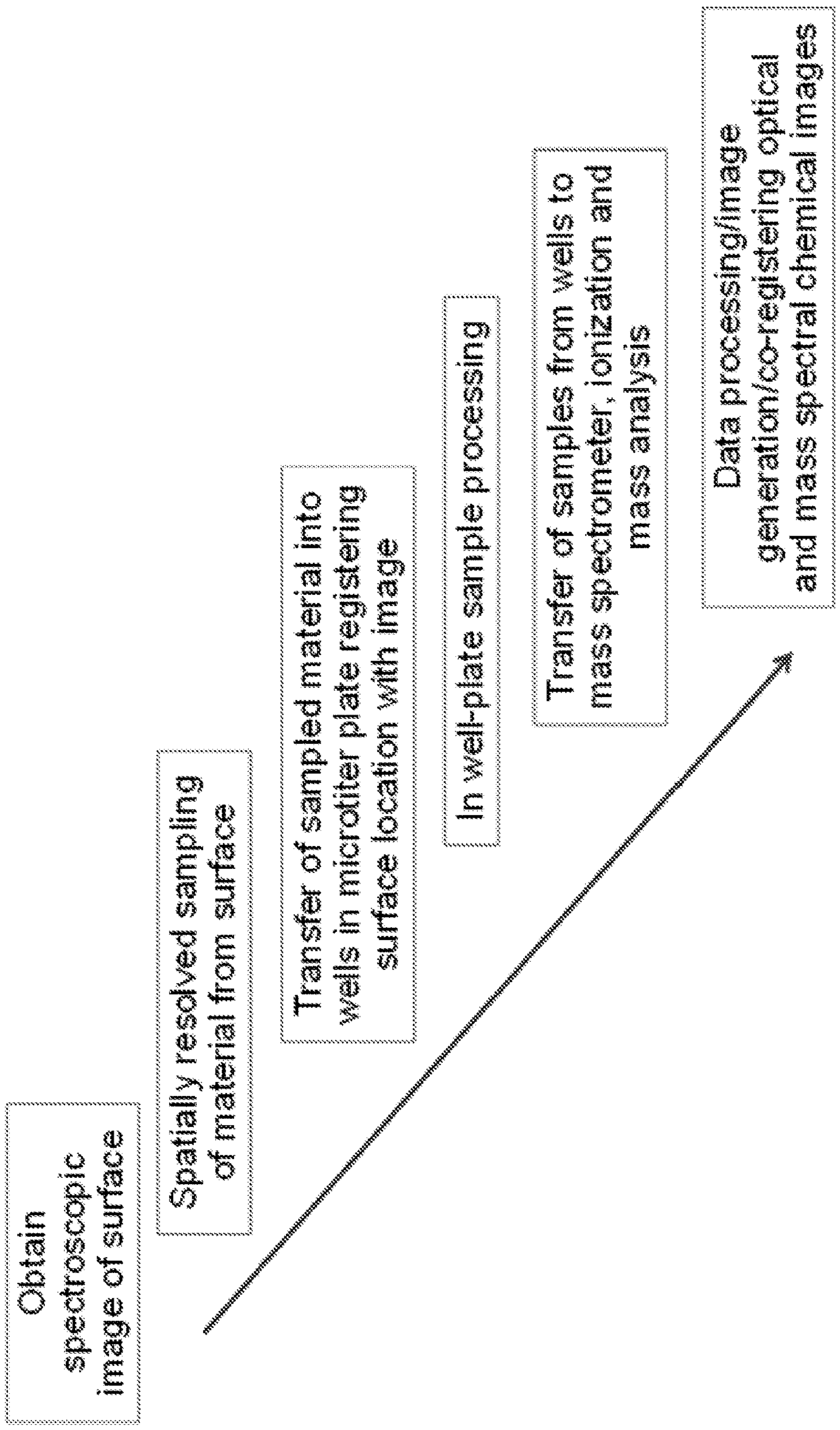
FIG. 2 is a diagram illustrating the generic workflow for embodiments of a correlated chemical mapping procedure.

For convenience, certain terms employed in the specification, examples and appended claims are collected here. These definitions should be read in light of the disclosure and understood as by a person of ordinary skill in the art.

As used herein, the terms "comprises" "comprising" "includes" "including" "has" "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, 'or' refers to an inclusive or and not to an exclusive or. For example, a condition A or B is satisfied by any one of the following: A is true (or present) and B is false (or not present), A is false (or not present) and B is true (or present), and both A and B are true (or present). Also, use of the "a" or "an" are employed to describe elements and components of the invention. This is done merely for convenience and to give a general sense of the invention. This description should be read to include one or at least one and the singular also includes the plural unless it is obvious that it is meant otherwise. Unless otherwise defined, all technical and scientific terms used herein have the same meaning as commonly understood by one of ordinary skill in the art to which this invention belongs. Although methods and materials similar or equivalent to those described herein can be used in the practice or testing of the present invention. Suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting. In the following description, numerous specific details are provided, such as the identification of various system components, to provide an understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention. Reference throughout this specification to "one embodiment" or "an embodiment' means that a particular feature, structure, or characteristic described in connection with the embodiment is included in at least one embodiment of the present invention. Thus, the appearance of the phrases "in one embodiment' or "in an embodiment" in various places throughout this specification are not necessarily all referring to the same embodiment. Furthermore, the particular features, structures, or characteristics may be combined in any suitable manner in one or more embodiments.

The articles "a" and "an" are used herein to refer to one or to more than one, i.e., to at least one, of the grammatical object of the article. The term "and/or" as used herein is defined as the possibility of having one or the other or both. For example, "A and/or B" provides for the scenarios of having just A or just B or a combination of A and B. If the claim reads A and/or B and/or C, the composition may include A alone, B alone, C alone, A and B but not C, B and C but not A, A and C but not B or all three A, B, and C components.

In some embodiments described herein a system and/or method is provided for a new concept for mass spectrometry-based mass and/or chemical imaging that overcomes the limitation of one-time analysis of the chemical contents of a pixel/voxel of a sample, the limited time for chemical analysis, and simplifies quantitation.

In some embodiments, systems and methods are provided that enable re-interrogation of a sample at a same spatial location multiple times and the ability to perform a multitude of different chemical and/or mass analysis on that sample. The chemical and/or mass analysis may include, for instance, mass spectral related measurements on the chemical contents of that physical sample location resulting in much greater detail (depth) of chemical information than heretofore possible, i.e. "deep dive" chemical imaging.

In some embodiments, sample material is sampled from a sample location on a larger material to be analyzed. The captured sample material is then transferred to a liquid before analysis and, accordingly conventional solution-based quantitation using isotope labeled standards and other techniques are simply implemented.

In embodiments, systems and methods are provided for spatially-registered storage of the chemical contents of each sampled pixel/voxel of sample material corresponding to the physical sampling location from the sample. The contents may be stored, for instance in a plate hotel allowing for any processing/analysis that may be desired in the future while preserving the correlated location data to associate the future processing/analysis of that sample material with previous analysis results.

Thus, embodiments provide a chemically rich correlated chemical mapping system and method in which mass analysis data, such as mass spectral data, analyzed at a sample location may be correlated back to that sample location. In some embodiments, a plurality of chemical evaluations may be performed on the same sample location. In some aspects, a plurality of different chemical analysis techniques may be applied to generate a diverse number of separate chemical analysis results, all corresponding to that same location. In some embodiments, the mass analysis data can be from regular spaced areas suitable for generating an "image" of a sampled portion of the material. In some embodiments, an optical/spectroscopic image of the sample may be captured and the sample locations may conveniently be correlated back to a corresponding location in the optical/spectroscopic image of the material to visually associate one or more chemical analyses of a sample location back to the physical location on the material.

The generic workflow for an embodiment of the correlated chemical imaging approach that combines optical/spectroscopic imaging with mass spectral data is depicted in FIG. 1. While the generic workflow of FIG. 1 describes the use of optical/spectroscopic images, this is only an exemplar embodiment. While the optical/spectroscopic imaging conveniently allows for correlation between chemical and/or mass analysis at sample locations with a visual indication of those location on the material, other known sample analysis techniques may be carried in place of the example of optical/spectroscopic imaging.

Step 1: Obtaining a Spectroscopic Image of the Material.

To begin the "deep dive" chemical imaging process of an imaging embodiment, one or more spatially-registered physical or chemical optical/spectroscopic images of the material that is to be analyzed that can be co-registered with the sampled locations and corresponding mass spectral data taken from each location. Any number of a variety of cameras or microscopes or other spectroscopic devices are used to obtain various types of optical and/or spectroscopic images of a material to be analyzed (hereinafter collectively referred to as the "spectroscopic imager"). Means to ultimately co-register the optical image with the mass spectral image should be included at the outset, such as appropriate fiducial markers on the material and/or holder to enable comparison overlay of different image information or inherent co-registering enabled by "all-in-one" imaging platforms. The kinds of spectroscopic images that are of utility include an optical brightfield—color and/or B&W and filtered—, fluorescence, infrared, Raman, autoradiography, x-ray, polarimetry, and/or topography images, maybe obtained using a spectroscopic charge coupled device (CCD) camera (Horiba, Ltd., Kyoto, JP), an optical bright field microscope (40×-1000×3 W LED Siedentopf Trinocular Dark & Bright field Compound Microscope (AmScope, Irving, CA, USA)), fluorescence microscope (Olympus Microscope BX61 with Fluorescence and Camera (Olympus Life Sciences, Shinjuku, Tokyo, JP), infrared spectrometer (NIRQuest 512 Near Infrared Spectrometer 900-1700 nm (Ocean Insight, Rostock, DE), raman spectrometer (Agiltron, Woburn, MA, USA), x-ray spectrometer (Bruker Optics, Inc., Billerica, MA, USA) and/or profilometer (Filmetrics, Inc., San Diego, CA, USA). Samples are prepared with various chemical or radiochemical tags or dyes and/or other markers to enhance the imaging techniques used.

Step 2: Spatially Resolving a Sampling.

Figure 3:
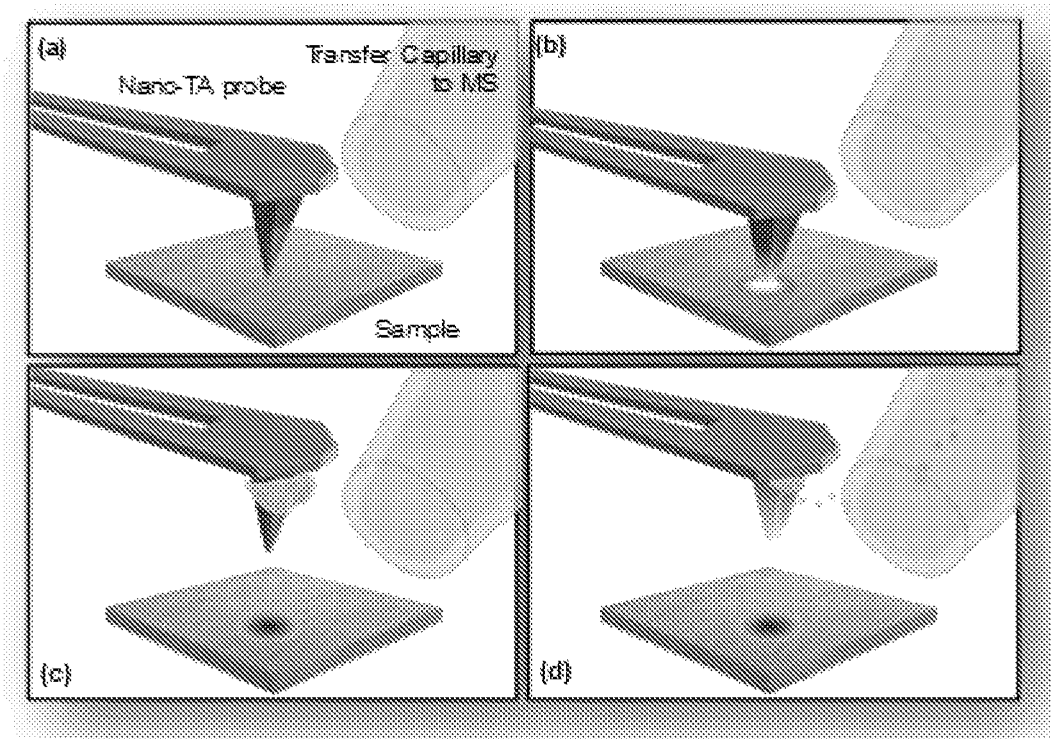
FIG. 3 illustrates low micrometer scale sampling by collecting material on the heated probe tip of an atomic force microscopy device (AFM)
Figure 4:
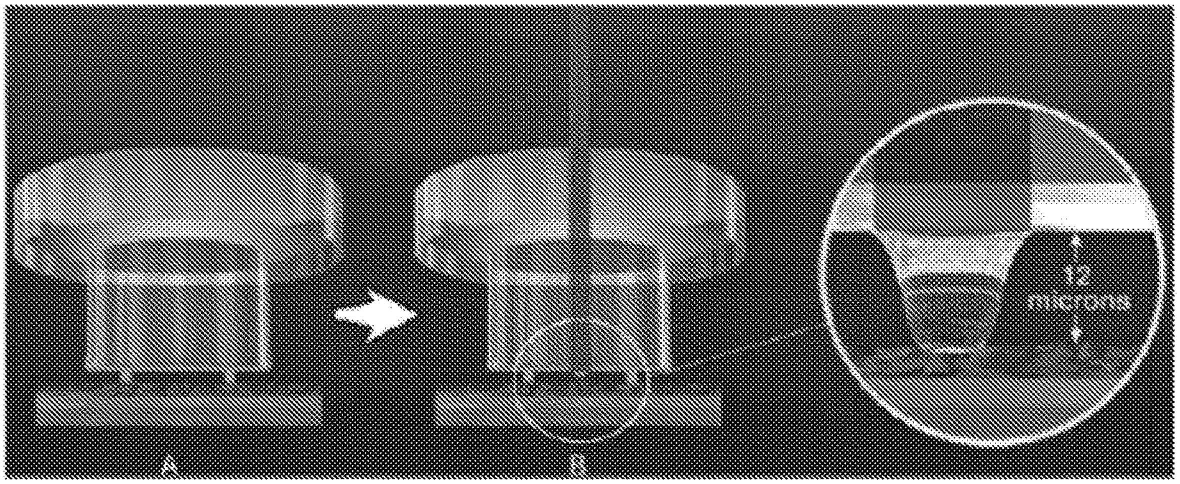
FIG. 4 is an illustration of the use of a laser (IR) to collect a sample comprising the steps A) placing a Capsure® device (Pantone, Carlstadt, NJ, USA) on wherein the rails on the device prevent the surface of the Capsure® from touching the tissue; B) passing an IR laser through the Capsure® device; and C) under laser pulse, expanding the polymer under the laser pulse forming a polymer-cell composite wherein the cells adhere to the melted membrane.

The next step is to isolate and/or sample material from a surface of a material, e.g. tissue at a spatially distinct and defined, i.e. registered, location and spatially isolate, i.e. spatially-registered, and collect the sample from the original matrix. Some spatially resolved "sampling systems" include, but are not limited to:

Thermal Based Sampling:

Sample material may be collected by directing heat at a sample location to liberate sample material from the material for collection. The heat may be directed, for instance by heating a desired location with a probe, so as to thermally desorb and collect material onto a cold surface, for instance using heated atomic force microscopy (AFM) tips (Owens S C et al., (2014), Anal Methods, 6:8940-5) See, FIG. 3 or heat a probe resistively or with an Capsure IR laser (Pantone, Carlstadt, NJ, USA) and collect material onto the probe at the heated location (Bevilacqua C and Ducos B, (2017), Mol Aspects Med, 59:5-27) See, FIG. 4.

Figure 5:
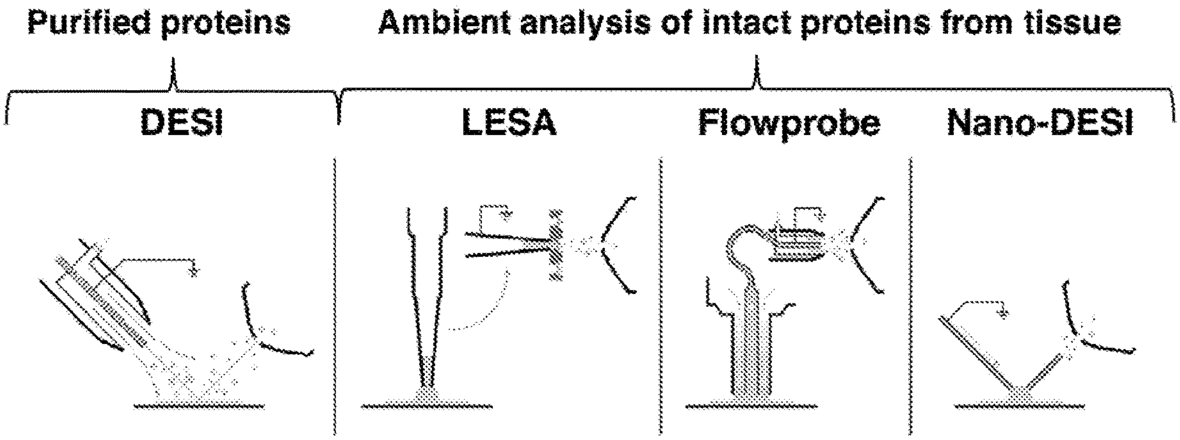
FIG. 5 is a schematic depicting ambient ionization mass spectrometry techniques (a) desorption electrospray ionization (DESI), (b) liquid extraction surface analysis (LESA), (c) flowprobe sampling and (d) nano-DESI.

Liquid Extraction Sampling:

A liquid extraction-based sampler such as droplet spray, e.g. DESI like, discrete droplet contact, e.g. LESA like, or a flowing liquid stream, e.g. flowprobe or nano-DESI like, may be used to extract a sampling of sample material from a surface (Griffiths R L et al., (2018), Curr Opin Chem Biol, 42:67-75) See FIG. 5. The systems of the present invention are configured to "capture" the sampled material rather than deliver the sampled material directly to the ion source of the mass spectrometer.

Figure 6:
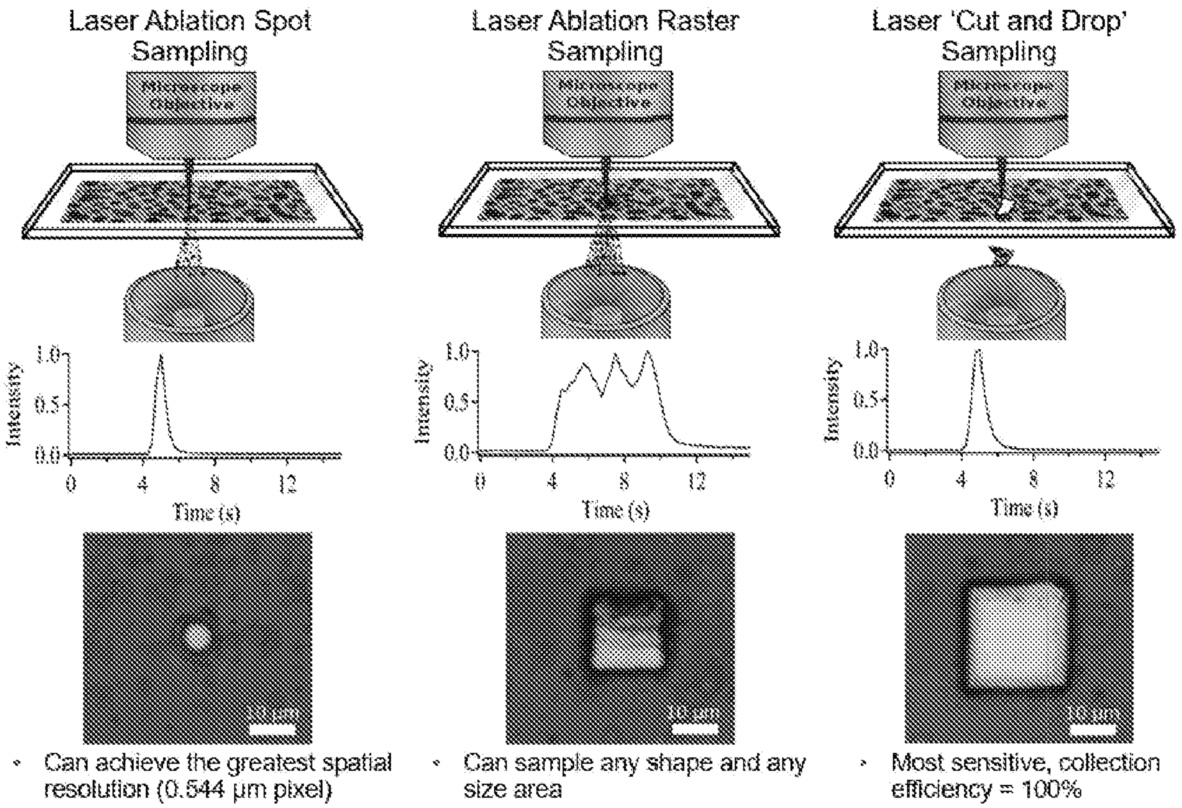
FIG. 6 are illustrations of variations of the use of a laser microdissection instrument, i.e. the Leica® LMD7000 system.

Laser Ablation/Microdissection Sampling:

A laser source, such as a laser microdissection instrument, may be used to ablate sample material from the material and transfer the sample material to a collection point in an automated fashion. A variety of equipment is commercially available with proprietary differences in cutting and collecting strategies. In the preferred embodiment, sampling can be achieved by laser ablation or "laser cut"—the cut-off sample material drops down (Leica®) or is ejected upward (ZEISS®) to a collection plate. The cut-off sample material that drops down utilizes a laser microdissection instrument, i.e. Leica® LMD7000 (Leica Microsystems, Inc., Buffalo Grove, IL, USA). As shown in FIG. 6, using laser ablation spot sampling achieves the greatest spatial resolution (0.544 μm pixel), laser ablation raster sampling allows for the sampling of any shape and size area and laser "cut and drop"

sampling resulted in the most sensitive collection efficiency at 100%. The cut-off sample is ejected upward using the ZEISS® Laser Capture Microdissection unit (LCM) (ZEISS® Microscopy, Jena, DE).

Sample Collection Probes:

A variety of sample collection probes pin/needle sampler: General instrumentation of pin spotters for microarray creation may be used, but in a reverse process where sample material is collected from a material using the pin(s), rather than depositing a spot of material on a surface as is performed by a pin spotter. Pin-based samplers are used to "sample" or "pickup" (or cut) sample material from a surface and bring the sample material to the well of a microtiter plate loaded with solvent where the sampled material is washed from the pins. An alternative approach is described in U.S. Pat. No. 9,153,425 B2 (Van Berkel, 2015), the entirety of which is incorporated by reference herein, wherein the sample material is collected by the pin(s) however in the '425 patent an open port probe type sampler is used to supply solvent to "readout" material from each pin sequentially and collect the sample material in the supplied solvent.

Figure 7:
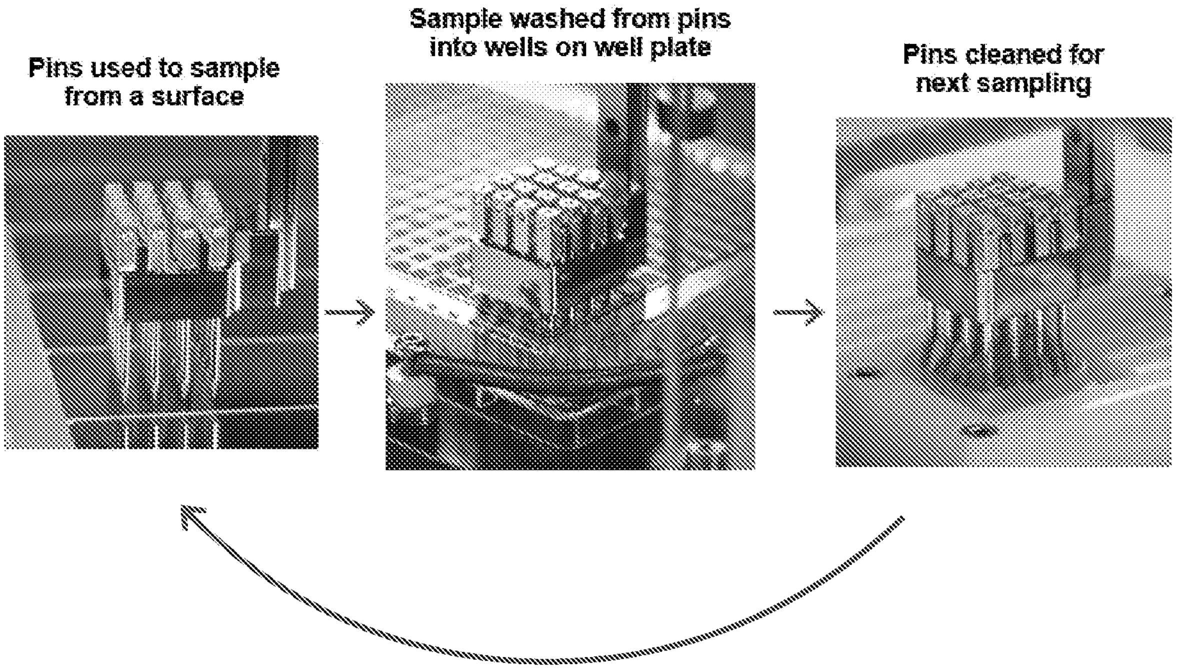
FIG. 7 depicts the pin/needle sample process.

Pins can be a variety of probes suitable for collecting sample material including, for instance, blunt, slotted, sticky pins or affinity pins, e.g., C18 pins, solid phase microextraction, solid phase microextraction fibres, or other suitable sample collection probes. For example, as shown in the example of FIG. 7, pins are first used to collect sample material from a surface of material to be analyzed. The collected sample material is washed from the pins into wells on a well microtiter plate (for instance, a 384 well microtiter plate pin spacing is 4.5 mm center to center for 1 mm sampling). The pins are cleaned for a next sampling and the process may be repeated either from the same location to a same or different well, or from a different location to a different well. In order to sample from a different location on the material surface the pins may be offset or translated for a second sampling location from the first sampling location. For example, the pins may be relocated at an offset location to achieve as close as a minimum spacing equivalent to the diameter of the sampling pin tip. For example, a pin set spaced to match a 384 well microtiter plate may achieve 2.25 mm point to point sampling or 1.1 mm sampling.

Step 3: Sample Material Collection.

After using any of the sampling methods described above to collect the sample material from the material, the collected sample material is transferred or captured by the sampling system which is operative to register the spatial location of collection from the material in association with a receptacle for receiving the sample material, such as a well of a multi-well processing plate that received the corresponding sample material from that spatial location. These plates could be, for instance, standard microtiter plates, e.g. 96-, 384-, 1536-well plates, or a substrate with confined regions by hydrophobic coatings, or other suitable receptacle or receptacles for receiving sample material. The use of a well plate is standard in material analysis, however other suitable receptacles such as vials, ampoules, etc. may be used.

Step 4: Sample Material Processing.

The spatially-registered sample material deposited in the receptacle, such as a well of a microtiter plate, and may, in some embodiments, be further processed to "ready" the sample(s) for the analysis step by utilizing none, one, some, or all of the known and emerging methods to process biological samples, such as, but not limited to, solubilization, concentration, dilution, extraction, digestion, derivatization, mixing with internal standards, magnetic bead mixing or combinations thereof (referred to collectively herein as the "chemical processing unit"). Two examples of devices used to achieve the goals of this step are a magnetic bead mixer (V&P Scientific, Inc., San Diego, CA, USA) and a solid phase extraction (SPE) well plate (Thermo Fisher Scientific, Waltham, MA, USA). The processing steps may include, for instance, sample separation, analyte isolation, analyte concentration, and other known processing steps to prepare sample material for chemical and/or mass analysis and to produce processed sample material suitable for chemical and/or mass analysis.

Step 5: Sample Material Delivery to Chemical and/or Mass Analyser.

A number of conventional droplet dispenser approaches can be used to transfer the sampled pixel/voxel chemical materials, i.e. sample material or processed sample material, from the well of a microtiter plate to a chemical and/or mass analyser such as a mass spectrometer (hereinafter collectively referred to as "sample transfer unit"), such as but not limited to, one or more of, gravity delivery, pipet, conventional autosampler with or without High Performance Liquid Chromatography (HPLC), acoustic droplet dispensers and pneumatic droplet dispensers. Other types of "sipper" samplers can also be used as a droplet dispenser. The use of individual, low nanoliter (nL) volume droplet samplings collected directly from the wells of the microtiter plate into a liquid stream transfer device to the ionization source of a mass spectrometer is preferred as it provides the most analytical advantages due to speed of transfer and low sample consumption resulting in multiple reanalysis or signal integration.

Figure 8A:
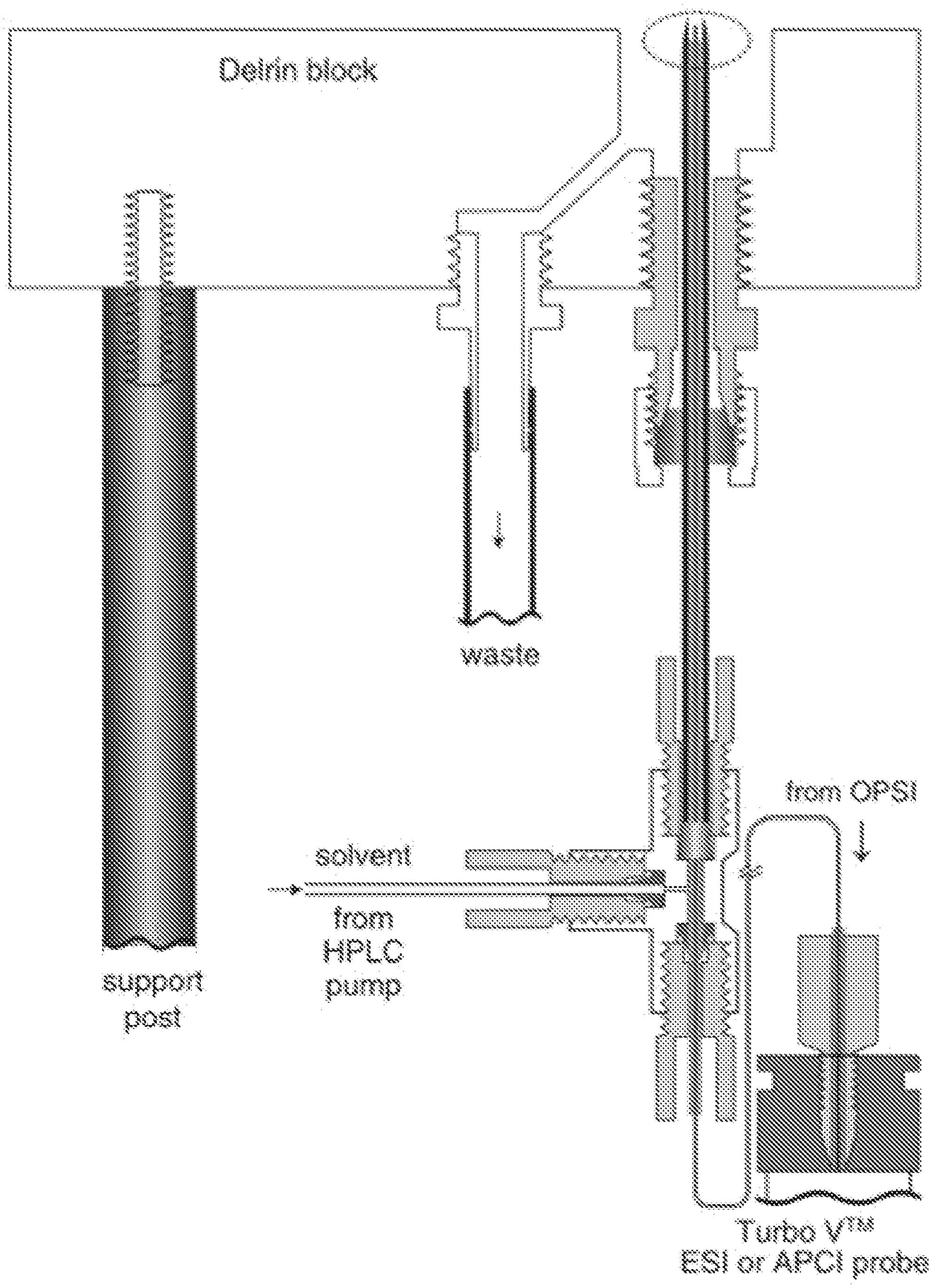
FIGS. 8A and 8B are schematic illustration of an Open Port Interface (OPI) FIG. 8A mounted in a Delrin® block (E. I. DuPont de Nemours and Co., Wilmington, DE, USA) incorporating a solvent overflow waste solvent port and held upright via a support post connected directly to the tower of the Turbo V™ ion source of a mass spectrometer. Details of the OPI sampling end (area in dotted circle) are shown in FIG. 8B.
Figure 8B:
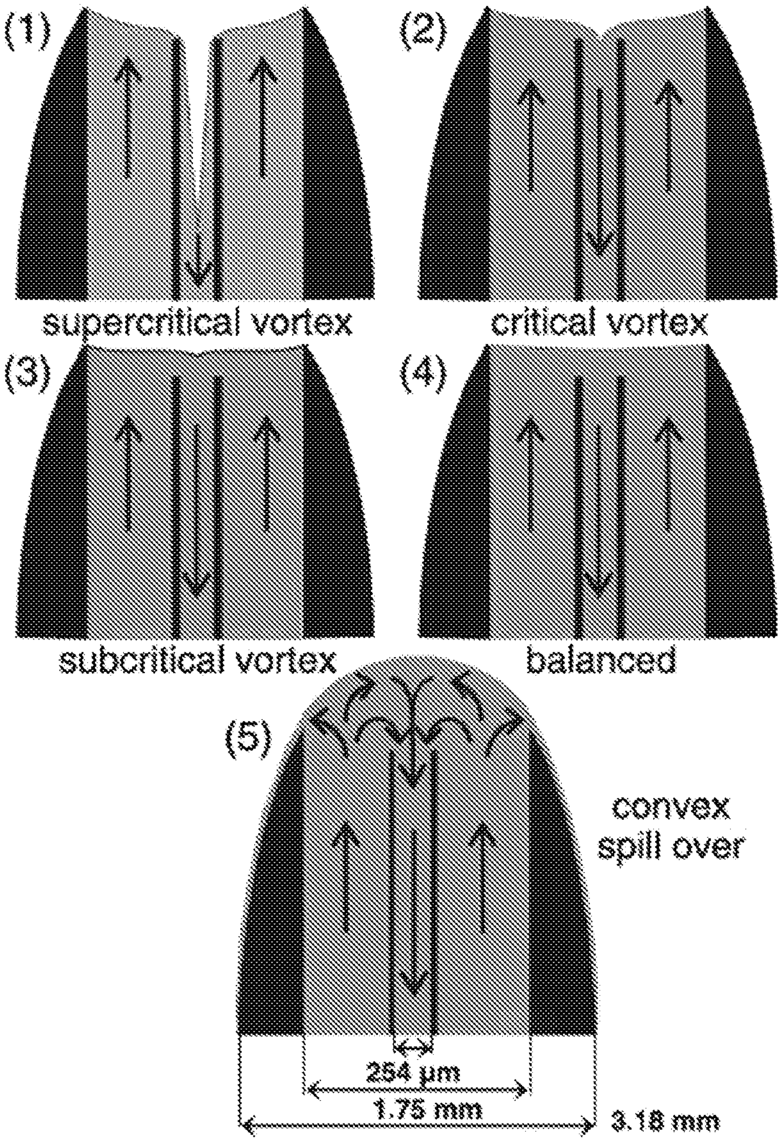

Droplet sampling combined with the "Open Port Sampling Interface (OPSI)" technique (U.S. Pat. No. 10,048,236 B2 (Van Berkel, 2018), U.S. Pat. No. 9,869,661 B2 (Van Berkel, 2018), and U.S. Pat. No. 9,632,066 B2 (Van Berkel, 2017) the teachings of which are incorporated herein in their entireties) See FIGS. 8A and 8B (Van Berkel G J and KerteszV, (2015), Rapid Commun Mass Spectrom, 29:1749-56, the teaching of which are incorporated herein in its entirety) or "Capture Probe" (co-axial or linear) technique (U.S. Pat. No. 10,060,838 B2 (Kertesz et al., 2018) the teachings of which is incorporated herein in its entirety) concept provide fast analyte delivery in a flowing stream of the liquid to the ion source of a mass spectrometer. The terms "OPSI" and "capture probe" are inclusively referred to as an open port interface (OPI) in the present application.

Reliable atmospheric pressure ionization methods, include, but not limited to, electrospray ionization (ESI), atmospheric-pressure chemical ionization (APCI) or atmospheric pressure chemical ionization (APPI), a variable dilution aspect that eliminates matrix effects for unprocessed samples and the noncontact injection system which eliminates the need for high pressure pumps and/or injector valves, minimizes potential for sample carryover and separates dispense and ionization processes. The full suite of ion mobility gas phase separation may be used to gain additional chemical information about transferred sample material.

The preferred droplet delivery approaches amenable to receptacles such as high density well plates include the acoustic ejection to open port sampling interface such as the Echo® Acoustic Liquid Handling Technology (LabCyte®, Inc., San Jose, CA, USA) and the ATS Gen4 or Gen4+ (EDC Biosystems®, Inc., Fremont, CA, USA) and the pneumatic dispensing approach (pressure-pulse induced droplet ejection to the liquid stream such as to an Open Port Interface (OPI)) provided by the I-DOT™ technology (Dispendix GmbH, Stuttgart, DE) as discussed in U.S. Pat. No. 8,759,113 B2 (Traube et al., 2014), da Silva et al., (2015), Cytotherapy, 17(11):1655-61 and Schober L et al., (2014), J Lab Autom, 20(2):154-63, the teachings of which are incorporated by reference in their entirety herein). Other alternative droplet delivery approaches such as electrostatic pulse ejection (U.S. Pat. No. 9,087,683 B2 (Girault et al., 2015) which intertwine droplet formation and ionization are not recommended as such approaches complicate coupling the OPI. Other possible droplet delivery approaches include a CTC or LS1 autosampler, as is known in the art. Once delivered to the chemical and/or mass analyser, analysis is conducted on the transferred sample material to obtain analysis results. In embodiments where analysis includes mass analysis by a mass spectrometer, for instance, the analysis results may include mass spectral data.

Step 6: Data Collection.

The analysis results generated by Steps 1 through 5, is processed and resulting correlated data is collected and associated with each collection of sample material from the material to be analyzed. For example, in embodiments where optical data is captured, the optical image captured by step 1 is generated and registered for each sample material at the corresponding sampling location. Similarly, chemical and/or mass analysis data, such as mass spectral chemical images, are co-registered with the aforementioned optical image and each data point is associated with its corresponding physical sampling location in the optical image. In embodiments where an optical image is not included, the data points of chemical and/or mass analysis data may be registered with the corresponding physical sampling location without inclusion of an optical image reference. In aspects, a plurality of chemical and/or mass analysis tests may be performed from the sample material collected at each sampling location and results from those tests may be co-registered at the corresponding physical sampling location for that sample material.

The novel method may use any alternative processes that eject samples of a desired volume from the receptacles such as wells of a microtiter plate for analysis, however, most are less desirable as the required speed, reanalysis and the elimination of matrix effects are not as readily achieved. For instance, autosamplers and HPLC are two methods currently being used to analyze the contents of the wells of microtiter plates, however, these processes are too slow for conveniently sampling large numbers of sample material. Some sample delivery combination examples include, for instance:

Direct contact sampling wherein a volume of sample is taken from a well and contacted to the liquid in the open port via a a. Syringe needle using the falling drop interface as discussed by Van Berkel and Kertesz (Van Berkel G J and Kertesz V, (2015), Rapid Commun Mass Spectrom, 29:1749-56) or b. Direct contact of the liquid with the sampling probe e.g. Open Port Probe (OPI) sampling.

Directly aspirating fractions of a collected samples collected from the wells into an ionization source using a sipper interface e.g., self-aspirating nebulizer.

Coupling laser capture microdissection with OPI-MS (further sampling processing such as digestion was found to be difficult).

Use of a microfluidic device with an opening as described in U.S. Pat. No. 9,719,894 B2 (Schlaudraff, 2017) to receive a sample that is delivered to the downstream for further processing or detection (further processing of multiple samples in parallel is difficult to conduct).

Figure 9:
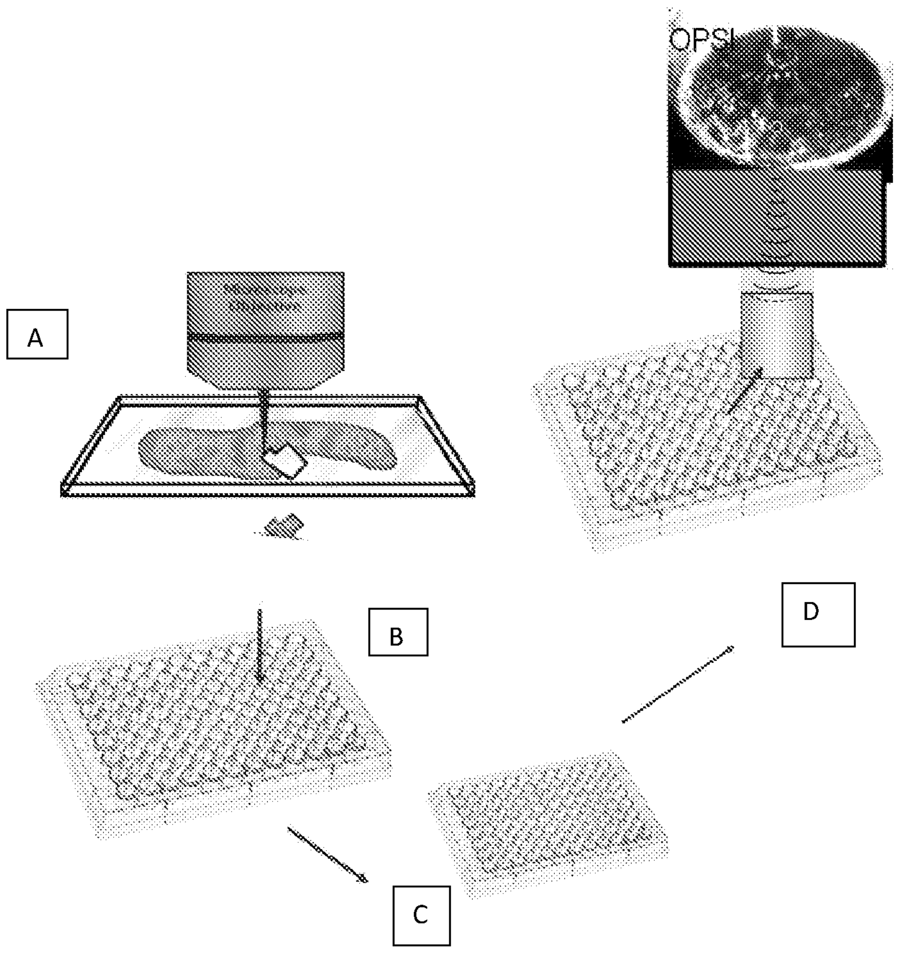
FIG. 9 illustrated embodiments of a method of deep dive chemical imaging.
Figure 10:
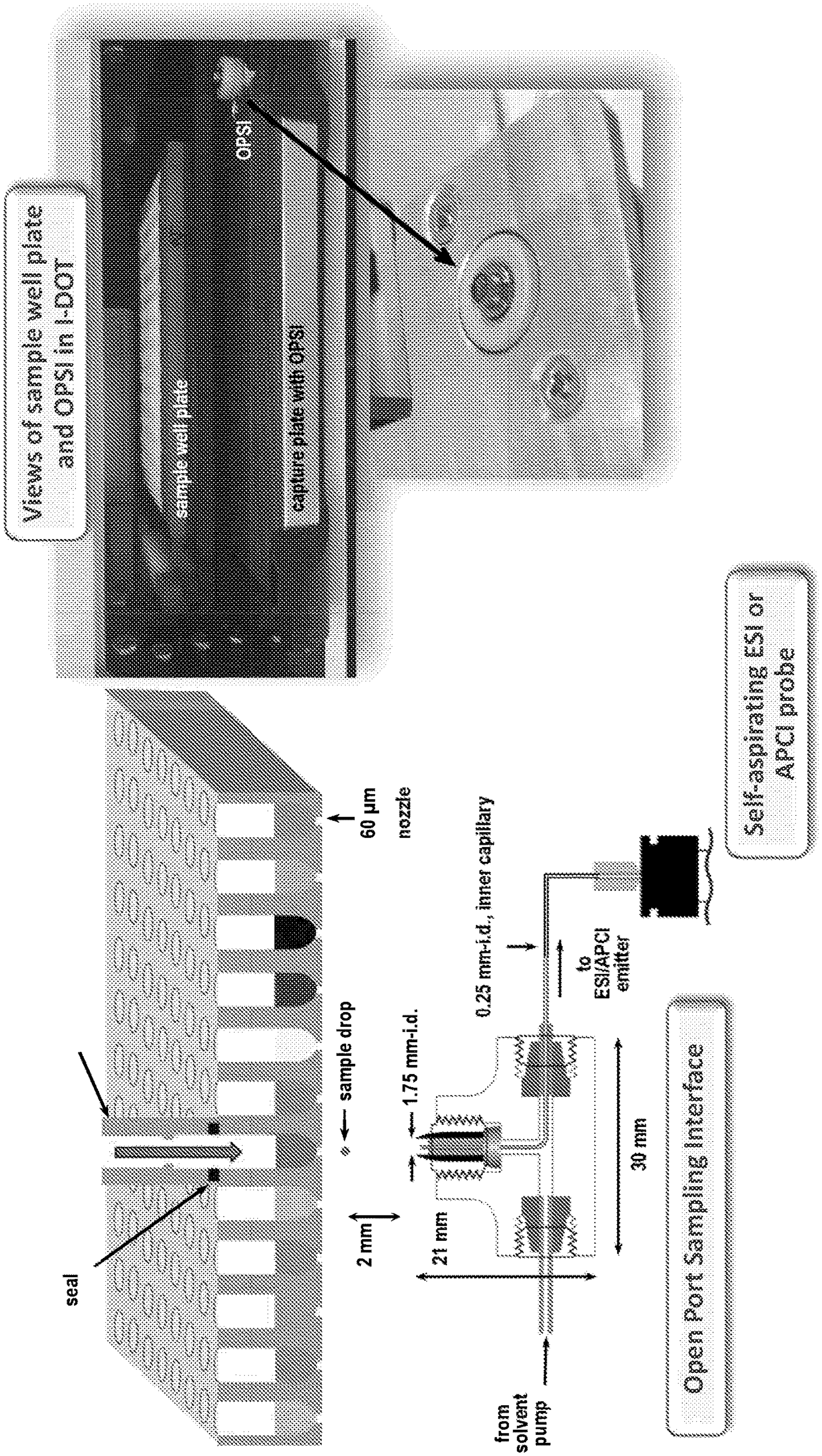
FIG. 10 illustrated the coupling of the I-Dot technology with mass spectrometry technology via an OPI.

Referring to FIG. 9, a preferred embodiment of the claimed system combines using a Leica® Laser Capture Microdissection (LCM) instrument (Leica® Microsystems, Inc., Buffalo Grove, IL, USA) for sampling sample material from a material with using the SCIEX® Ion Mobility Spectrometry (IMS)-Quadruple Time-of-Flight (QTOF) or HPLC-MS-Triple Quad sample analyzers (SCIEX®, Framingham, MA, USA) utilizing an acoustic droplet dispenser See FIG. 10. This combination provides high sampling spatial resolution, analysis speed, and depth of chemical information obtainable from a chemical imaging experiment—nonpareil in the mass spectrometry imaging of molecular species. Delivery of the sampled pixel/voxel chemical materials from each sampling location to the mass spectrometer is accomplished by extracting low nL volume droplets from each receptacle, such as from each the well of the microtiter plate, and transferring the extracted droplets into a liquid stream transfer device (OPI). The OPI captures and dilutes the samples and then diluted samples are transferred by the liquid stream to the ionization source of a mass spectrometer. The transfer device is preferably a version of the open port sampling interface or capture probe as discussed in U.S. Pat. No. 9,869,661B2 (Van Berkel, 2018) and U.S. Pat. No. 10,060,838 B2 (Kertesz et al., 2018), the teachings of which are incorporated in their entireties herein. This ejected sample droplet to open port concept enables the speed of analysis required for chemical imaging feasibility and repetitive analysis of the same pixel/voxel location chemical contents stored in each well. The known, controllable sample dilution of the open port concept when the sample is miscible in the transfer fluid can be used to advantage for eliminating matrix effects without the need for any other sample processing. In embodiments where the sample is immiscible in the transfer fluid, then sample processing may need to be conducted in advance to eliminate matrix effects.

The sampled materials are delivered from the receptacles to a flowing stream of liquid via an OPI or capture probe to the ion source of a mass spectrometer, thus the full suite of atmospheric pressure ionization sources is available for use. Among these are electrospray ionization (ESI), atmospheric pressure chemical ionization (APCI), atmospheric pressure chemical ionization (APPI), in both positive and negative ion mode, or even elemental ionization via inductively coupled plasma (ICP) ionization. It is also possible to use the full suite of ion mobility gas phase separations (at ambient pressure or under vacuum) to gain additional chemical information from the sample. The mass spectrometer used can be a quadrupole, multiquadrupole, time of flight system or an ion trap variant or a hybrid combination of any of these. Various forms of tandem mass spectrometer may be used to glean additional chemical information from the gas phase ions that enter the mass spectrometer and provide input data for the correlated chemical maps that result from a sample analysis.

Referring to FIG. 9 in more detail, in step A, in an embodiment a brightfield or fluorescence image of the material is taken and automated laser microdissection spatially resolves the sampling at 1-40 μm spot size at one or more sampling locations on the material. In step B, each sample material collected and its sampling location on the material is registered to a specific receptacle, such as a unique well in a microtiter plate, and the brightfield and/or fluorescence image taken in step A is attributed to the well in which the sample is deposited. In step C, if necessitated or desired, the sample in the well is processed (e.g. cleaned up, fractionated, digested and the like) as described above.

In step D, the sample material contents of a well of the microtiter plate may be analyzed, for instance by using acoustic dispense to OPI-ESI (APCI-MS), high throughput screening (>1 well/s) and/or multiple repetitive chemical measurements including, but not limited to, signal averaging, targeted analysis, ion mobility scanning, simple quantitation and the like. The chemical and/or mass analysis results derived from the analysis may then be registered or associated with that well, and accordingly with the sampling location on the material.

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

Unless otherwise indicated, all numbers expressed quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present invention.

The above discussion is meant to be illustrative of the principle and various embodiments of the present invention. Numerous variations, combinations and modifications will become apparent to those skilled in the art once the above disclosure is fully appreciated. It is intended that the following claims be interpreted to embrace all such variations and modifications.

We claim:

1. A system for chemical mapping comprising:

a spectroscopic imager to obtain one or more physical or chemical spatially-registered spectroscopic images of a material to be analyzed;

a sampling system to obtain a spatially-registered sample from the material to be analyzed and to transfer said material to a corresponding receptacle;

a sample transfer unit to introduce said spatially-registered sample, or a portion thereof, from the receptacle to a mass spectrometer for analysis to produce analytical mass spectral data; and a data analysis system to collect and store the one or more physical or chemical spectroscopic images and the analytical mass spectral data wherein said data analysis system further generates co-registered information regarding the spatially-correlated spectroscopic images and the analytical mass spectral chemical data.

2. The chemical mapping system of claim 1, further comprising:

a chemical processing unit to process the spatially-registered sample in the receptacle before transfer to the mass spectrometer.

3. The chemical mapping system according to claim 1, wherein the spectroscopic imager is selected from the group consisting of a charge coupled device camera, optical bright field microscope, a fluorescence microscope, an infrared spectrometer, a Raman spectrometer, a X-ray spectrometer, a profilometer, an optical imager, and combinations thereof.

4. The chemical mapping system according to claim 1, wherein the sampling system used to obtain a spatially-registered sample from the material to be analyzed and to transfer said material to a processing plate is selected from the group consisting of a laser microdissection instrument, a pin-based sampler, a liquid extraction-based sampler and combinations thereof.

5. The chemical mapping system according claim 1, wherein the receptacle is a well of a microtiter plate.

6. The chemical mapping system according to claim 2, wherein the chemical processing unit employed to process the spatially-registered sample in the receptacle is a magnetic bead mixer or a solid phase extraction well plate.

7. The chemical mapping system according to claim 1, wherein the sample transfer unit is used to introduce the spatially-registered samples or portions thereof from the receptacle to a mass spectrometer for analysis as droplets using a droplet dispenser wherein said droplet dispenser is a gravity delivery dispenser, sipper sampler, pipet, an acoustic droplet dispenser or a pneumatic droplet dispenser.

8. The chemical mapping system according to claim 7, wherein the sample droplets from the droplet dispenser are transferred to an ionization source of the mass spectrometer using an open port interface (OPI).

9. The chemical mapping system according to claim 1, wherein the sample transfer unit that is used to submit a spatially-registered sample, or a portion thereof, from the receptacle to a mass spectrometer for analysis is an autosampler wherein a specific location on the receptacle from which the spatially-registered sample is taken from is recorded.

10. The chemical mapping system according to claim 8, wherein the ionization source of the mass spectrometer is selected from the group consisting of: electrospray ionization, atmospheric pressure chemical ionization, atmospheric pressure photoionization, corona discharge, bombardment, or inductively coupled plasma ionization.

11. The chemical mapping system according to claim 1, wherein said mass spectrometer subjects the spatially-registered sample to ambient or vacuum based ion mobility spectrometry prior to mass spectral analysis.

12. The chemical mapping system according to claim 1, wherein the mass spectrometer is selected from the group consisting of a quadrupole mass spectrometer, a multiquadrupole mass spectrometer, a time of flight system mass spectrometer, an ion trap variant mass spectrometer and a hybrid combination thereof.

13. A method to perform a correlated chemical mapping of a sample comprising the steps of taking one or more spectroscopic physical or chemical images of a material to be analyzed by mass spectroscopy;

extracting one or more spatially-registered samples from the material and transferring each of said extracted spatially-registered samples to a corresponding receptacle;

transferring one or more spatially-registered samples from the corresponding receptacles to a mass spectrometer for analysis;

analyzing said one or more spatially-registered samples using mass spectrometry;

generating analytical mass spectral data for each of the spatially-registered samples; and processing the one or more spectroscopic physical or chemical images and the mass spectral data to produce co-registered spatially correlated spectroscopic data and analytical mass spectral data for each of the spatially-registered samples.

14. The correlated chemical mapping method of claim 13, further comprising processing the extracted spatially-registered one or more samples in the receptacles before transfer to the mass spectrometer.

15. The correlated chemical mapping method according to claim 13,
wherein the one or more spectroscopic physical or chemical images are taken using a spectroscopic imager selected from the group consisting of a charge coupled device camera, optical bright field microscope, a fluorescence microscope, an infrared spectrometer, a Raman spectrometer, a X-ray spectrometer, a profilometer, an optical imager, and combinations thereof.

16. The correlated chemical mapping method according to claim 13,
wherein the step of extracting one or more spatially-registered sample from the material and transferring said extracted spatially-registered sample to a receptacle is accomplished by using a laser microdissection instrument, a pin-based sampler, a liquid extraction-based sampler and combinations thereof.

17. The correlated chemical mapping method according to claim 13,
wherein the receptacle is a well of a microtiter plate.

18. The correlated chemical mapping method according to claim 14, wherein the step of processing the extracted spatially-registered one or more samples in the receptacles is achieved using a magnetic bead mixer or a solid phase extraction well plate.

19. The correlated chemical mapping method according to claim 13,
wherein the step of submitting one or more spatially-registered samples to a mass spectrometer for analysis is achieved by transferring the one or more spatially-registered samples, or portions thereof, as droplets using a droplet dispenser wherein said droplet dispenser is a gravity delivery sampler, sipper sampler, pipet, acoustic droplet dispenser or a pneumatic droplet dispenser.

20. The correlated chemical mapping method according to claim 17, wherein the spatially-registered sample droplets from the droplet dispenser are transferred to the ionization source of a mass spectrometer using an open port interface.

* * * * *